United States Patent [19]
Kanno et al.

[11] Patent Number: 5,049,428
[45] Date of Patent: Sep. 17, 1991

[54] OPTICAL INFORMATION RECORDING MEDIUM

[75] Inventors: Toshiyuki Kanno, Tokyo; Yasuji Nagata, Hachioji; Naoyuki Ueno, Machida, all of Japan

[73] Assignee: Olympus Optical Co., Ltd., Tokyo, Japan

[21] Appl. No.: 445,533

[22] Filed: Dec. 4, 1989

[30] Foreign Application Priority Data

Dec. 8, 1988 [JP] Japan .............................. 63-310713

[51] Int. Cl.$^5$ .............................................. B32B 3/02
[52] U.S. Cl. ...................................... 428/64; 428/500; 428/65; 428/913; 369/283; 369/288; 346/76 L; 346/135.1
[58] Field of Search .......................... 428/64, 65, 913; 369/283, 288; 346/76 L, 135.1

[56] References Cited

U.S. PATENT DOCUMENTS 4,873,131 10/1989 Kashima et al. ..................... 428/64

FOREIGN PATENT DOCUMENTS

2148290 7/1987 Japan ..................................... 428/64

Primary Examiner—Patrick J. Ryan
Assistant Examiner—Elizabeth Evans
Attorney, Agent, or Firm—Frishauf, Holtz, Goodman & Woodward

[57] ABSTRACT

An erasable optical information recording medium has a transparent substrate, and a recording layer supported by the substrate. The recording layer includes a thin film of at least one polydiacetylene having side chains. The polydiacetylene is capable of undergoing a reversible planar-nonplanar transition of the main chain structure of the polydiacetylene due to a conformational change of the side chains produced by irradiation of light. When the recording layer is irradiated with light, the reversible planar-nonplanar transition occurs at the irradiated portions to cause a corresponding change of optical properties of the recording layer, thereby recording information thereinto and erasing information therefrom.

19 Claims, 7 Drawing Sheets

FIG. 15

OPTICAL INFORMATION RECORDING MEDIUM

BACKGROUND OF THE INVENTION

1. Field of the Invention

This invention relates to an optical information recording medium, and in particular a recording medium wherein an organic polymeric material is used as a recording layer and optical information can be repeatedly recorded, reproduced and erased.

2. Description of the Related Art

In recent years, due to the progress of laser technology, much research is being carried out on optical information recording media wherein information is written, read and erased by means of a laser beam. There are moreover two methods of recording information on such media, namely a photon mode wherein the laser light is used as photons, and a heat mode wherein the laser light is used as heat.

Photon mode recording media are characterized by high sensitivity, and by the high speed with which information can be recorded. Examples of such recording media have been proposed wherein a photochromic material is used as the recording layer, for example spiropyran (Published Unexamined Japanese Patent Application (PUJPA) No. 60-177084 and Preprints of the 50th Annual Spring Meeting of the Japan Chemical Society No. 1, p. 253 (1985)), fulgide or indigo (PUJPA) No. 61-128244 and J. Chem. Soc., Perkin Trans. 1, 197 (1981) and 2, 341 (1981)), and diallylethene (PUJPA No. 63-24245). However, although the recording media described in these proposals have the above advantages, the recording layer tends to undergo a back photochromic reaction and is less resistance to the reading light. As a result, their stability in the colored state and reproduction repeatability are not good, and their information retention properties are also poor.

In heat mode optical recording media, on the other hand, when light irradiates the recording layer, it causes local melting, thermal deformation or phase transition at the irradiated portions. Differences in optical properties are therefore produced at the portions in the media where the changes occur, and this effects the recording of the information. The reproduction of the recording is effected by detecting these differences of optical properties (reflectance and refractive index, etc.). Examples of recording media of this type use magneto-optical materials such as TbFe, GdFe and TbFeCo as the recording layer, or chalcogen alloys such as TeOx, Te-Ge, Te-Ge-Sb and Te-Ge-Sb-Tl as the recording layer as according to Ovshinsky et al. Recording media having these inorganic materials however have disadvantages of low sensitivity, toxicity and poor retention of recorded information. Further, high speed recording and erasure is impossible, and overwrite performance is inadequate.

To overcome the disadvantages of these inorganic materials, intensive research has begun to be carried out on recording media using organic polymeric materials, for example using a mixture of thermoplastic polymers and pigments which absorb in the near infrared as the recording layer 58-48245), or using the phase separation of polymer blends for recording. Further, recording media using polymeric liquid crystals are also known (see Polym. Commun. 24, 364, 1983; PUJPA Nos. 59-10930 and 60-114823; Macromolecules, 17, 1004-1009, 1984; Advances in Polymers, 59, 37, 1984; PUJPA Nos. 61-28004 and 62-175939; DE 3500838 Al; and PUJPA Nos. 58-125247 and 63-98852). Recording media using these organic polymeric materials were, however, unsatisfactory from the viewpoints of recording sensitivity, reproduction repeatability, recording speed, contrast and/or recording retention.

Recently, polydiacetylenes with conjugated $\pi$ electron have been reported to undergo phase transitions by the application of external energy such as light energy, heat energy, mechanical energy or electrical energy (J. Chem. Phy. Vol. 70(9), No. 1, 4387 et seq. (1979), Vol. 71(1), 206 (1979), and Vol. 67, No. 8, 3616 et seq. (1977); Polymer Preprints, Japan, Vol. 35, No. 6, 393 (1986); Solid State Physics, Vol. 20, No. 11, 845 et seq. (1985); Japan Physics Soc., 84th Autumn Meeting, 323; and Japan Physics Soc. 85th Autumn Meeting, 323). Laser recording media using polydiacetylenes are disclosed in PUJPA No. 56-147807, while recording media using pigments in conjunction with polydiacetylenes are disclosed in PUJPA Nos. 60-192686 and 62-175940. The media disclosed in these references are, however, all based on an irreversible change of color tone of polydiacetylenes, and although information can be recorded and reproduced, it cannot be erased. Further, recording media based on a change in the main chain structure of the polydiacetylene between an acetylene configuration and a butatriene configuration, are disclosed in PUJPA Nos. 61-203448 and 61-203454. These media however are unsatisfactory from the viewpoint of contrast, recording retention, erasability and repeatability.

SUMMARY OF THE INVENTION

It is therefore an object of this invention to provide an erasable optical information recording medium with excellent characteristics from the viewpoint of contrast, sensitivity, repeatability and recording retention.

A further objective of this invention is to provide a heat mode optical information recording medium with a polydiacetylene compound as a recording layer, wherein recording and erasure of the recording are effected due to reversible planar-nonplanar transition in the main chain structure of the polydiacetylene compound.

These and other objects which will become clear from the following discussion, are achieved by an erasable optical information recording medium comprising a transparent substrate; and a recording layer supported by the substrate and comprising at least one polydiacetylene with side chains, said polydiacetylene being capable of undergoing a reversible planar-nonplanar transition of the main chain structure due to conformational changes in the side chains produced by irradiation of light. When the recording layer is irradiated by light, the reversible planar-nonplanar transition occurs at the irradiated portions. This causes a change of optical properties which makes the recording and erasure of information possible.

DETAILED DESCRIPTION OF THE PREFERRED EMBODIMENTS

This invention will now be described in more detail with reference to the accompanying drawings. Throughout the drawings, identical parts or portions are referred to by identical reference numerals.

In the optical information recording medium of this invention, the polymeric material used to form the recording layer is a polydiacetylene compound with side chains. As mentioned above, it has already been reported that polydiacetylenes undergo color changes by the application of external energy such as light energy, heat energy, mechanical energy or electrical energy. Typically, the polydiacetylene changes from blue to red. In this technical field, this color change is generally understood to be due to changes in the conjugated $\pi$ electrons of the polydiacetylene main chain.

In the past, it was thought that there were two basic structures for the polydiacetylene main chain, namely an acetylene configuration (Type A) and a butatriene configuration (Type B), and that the changes of conjugated electrons were due to phase transitions between Type A and Type B (see PUJPA Nos. 61-203448, 61-203454 and 61-203455). According however to solid resolution NMR measurements by many workers including the present inventors, it has been confirmed that there is no great change in the main chain structure of the polydiacetylene, and that the butatriene structure is not a stable configuration. This opinion has now become general.

It has now been found that changes in the conjugated electron structure of the main chain of the polydiacetylene arise from a planar-nonplanar transition due to conformational changes in the side chains resulting from mutual interaction between them. Based on this view, the present inventors have therefore made studies on polydiacetylene side chains and compounds which could be used in conjunction with such polydiacetylenes, as well as the construction of the medium, with a view to their application as a heat mode erasable recording medium, and thereby arrived at the present invention.

The polymeric material used as a recording layer in this invention, as already mentioned, is a polydiacetylene compound with side chains. Due to mutual interactions between the side chains (for example hydrogen bonds), reversible conformational changes take place. This gives rise to a reversible planar-nonplanar transition of the main chain structure, and induces a reversible change in the electronic state of the main chain. As a result of this change in the electronic state of the main chain, differences in optical properties (reflectance and refractive index, etc.) of the recording layer occur, and this permits recording and erasure.

It is desirable that the polydiacetylene compound has a repeating unit derived from a diacetylene or alkadiyne monomer which can be represented by the formula (I):

$$Ra-C\equiv C-C\equiv C-Rb \quad (I)$$

In this formula, Ra and Rb are identical or dissimilar, and can be represented as a -[spacer]-[functional group]-[terminal group], which will be explained below in more detail.

Spacer

Where the polydiacetylene exhibits thermochromism, the spacer bonded directly to the polydiacetylene main chain exerts an effect on the behavior and mutual interaction of side chains causing a transition to occur in the main chain. Examples of such spacers are:

where n is an integer of 1 or more, m is an integer from 2 to 12, and p is an integer from 1 to 12. These spacers may or may not contain an oxygen atom, but there is not much difference in effect between the two. If however the number of carbon atoms in the spacer is too large, a conformation is produced wherein there is too much stability between the side chains, and the reversible planar-nonplanar transition of the main chain tends to become difficult. It is preferable therefore that n, m and p all lie in the range of 2 to 7.

Functional Group

Direct mutual interactions between functional groups cause reversible conformational changes of whole side chains, and this gives rise to a reversible planar-nonplanar transition of the polydiacetylene main chain. It is preferable that the functional group is capable of hydrogen bonding, and more preferable that the hydrogen bonds formed are strong. Examples of such groups include those having urethane bonds, amide bonds, imide bonds and amidoimide bonds, for example esters, amides, imides and amidoimides of carboxylic acid, sulfonic acid, sulfinic acid, isocyanic acid and carbamic acid. More specific examples are:

—CONH—

—CONHCO—

—NHCONH—

—CONHCH₂OCO—

—CONHCH₂COO—

—NHCOO—

—OOCCH₃NHCOO—

—CON(CH₃)—

—N=N—

Terminal Group

It is desirable that the terminal group is easily aligned. Examples of such terminal groups are straight chain alkyl groups, straight chain unsaturated hydrocarbons having double bonds or triple bonds, aromatic hydrocarbon groups with benzene rings or naphthalene rings, or similar groups substituted by cyano groups, hydroxyl groups, halogens or nitro groups, all with little steric hindrane. More preferable terminal groups are straight chain alkyl groups containing from 2 to 10 carbon atoms, phenyl groups, and phenyl alkyl groups having from 1 to 6 carbon atoms in the alkyl moiety.

It is desirable that the polydiacetylene of this invention is a polymer of monomers represented by the formula (I). It is more preferable that it is a homopolymer, but it may also be a copolymer of a monomer represented by the formula (I) and another diacetylene monomer represented by the formula:

Ra—C≡C—C≡C—H and/or

H—C≡C—C≡C—H where Ra has the meaning given above.

Figure 1:
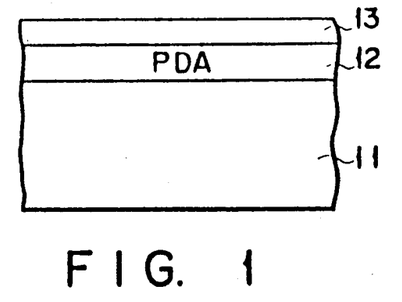
FIGS. 1 to 7 schematically show the structure of recording media according to different embodiments of this invention, respectively.

FIG. 1 shows an optical information recording medium according to a first embodiment of this invention. This recording medium has a transparent substrate 11, and a recording layer 12 formed on the substrate 11. The transparent substrate 11 is formed from a material with good optical transmittance. Examples are inorganic materials such as glass, and polyester, polycarbonate, polyvinyl chloride, polyamide, polyacrylate, polymethacrylate, epoxy resins and olefinic plastic molding materials.

The recording layer 12 is formed of a thin film of the polydiacetylene described above. For this purpose, the diacetylene monomer may first be formed as a film on substrate 11 by vacuum deposition, or the diacetylene monomer may be dissolved in a suitable organic solvent (for example methyl ethyl ketone, chloroform or dichloroethane, etc.), coated on substrate 11 by spin coating, screen printing, roll coating, immersion or Langmuir-Blodgett's technique, and dried to form a film of diacetylene monomer. The diacetylene monomer film can then be polymerized by irradiation with heat, light, rays, X-rays or an electron beam (solid phase polymerization). The polydiacetylene may for example be represented by the formula:

As can be seen form the above formula, the main chain structure of the polydiacetylene used in this invention has conjugated $\pi$ electron system.

The thickness of the polydiacetylene film or recording layer is not critical, however from the viewpoints of medium sensitivity and contrast, it should preferably be approx. 100 nm to 10 $\mu$m.

Figure 8:
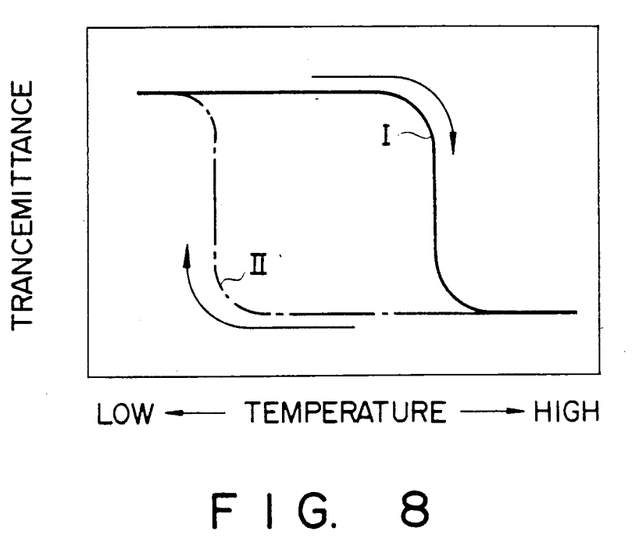
FIG. 8 is a graph showing transmitted light-temperature characteristics to explain the principle of recording and erasure in the recording medium of this invention.

As described above, when the polydiacetylene is irradiated with light, conformational changes takes place in the side chains causing a planar-nonplanar transition in the main chain. It is believed that the conformational changes of the side chains depend on the forming and breaking of hydrogen bonds between them brought about by the irradiation. This causes the planar-nonplanar transition to occur in the main chain, and the optical properties of the polydiacetylene film (reflectance or transmittance, and refractive index etc.) change correspondingly. The planar structure corresponds to the situation where hydrogen bonds exist; the nonplanar structure, on the other hand, corresponds to the situation where they are broken or not formed. The polydiacetylene used in this invention exhibits a different planar-nonplanar transition point depending on whether the temperature is rising or falling. As seen in FIG. 8, the temperature - transmittance characteristic is a hysteresis loop. In the figure, the arrows shown where the temperature is rising or falling; the symbols I and II respectively denote the transition points for rising and falling temperature. If the recording layer is irradiated with light (for example a laser beam, and preferably a semiconductor laser beam). causing the temperature of the layer to rise above transition point I, and the layer is rapidly cooled, information can be recorded. If then the layer is heated to a temperature above transition point II but below transition point I, and gradually cooled to a temperature below transition point II, the recording can be erased. Conversely, the recording layer may be heated to a temperature above transition point II but below transition point I, and gradually cooled to a temperature below transition point II to record; and then heated to a temperature above transition point I followed by rapid cooling to erase. It is preferable that the polydiacetylene used in this invention has a transition point II of no less than 60° C., and more preferably no less than 80° C. In such a case, the retention of the recording is good, recording capability and reproduction capability are improved, and little noise is generated.

In general, polydiacetylene exhibits a blue color at temperatures below transition point II, and a red color at temperatures above transition point I.

Returning again to FIG. 1, a light reflecting layer 13 may also be formed on the recording layer 12. This reflecting layer may consist of a metal, for example aluminum, gold, silver, copper, nickel or alloys, or an organometallic compound, and it may conveniently formed by vapor deposition. The reflecting layer 13 increases the difference of light reflectance when reproduction of the recording is effected by detecting this difference. Further, it not only increases S/N ratio, but also contributes to noise reduction. The thickness of reflecting layer is generally from 5 to 1000 nm.

The present inventors have found that at least one light-absorbing compound may also be incorporated in the recording layer 12 (concentration approx. 0.1 to 10% by weight), or made to form another layer (preferably having a thickness less than the polydiacetylene film) adjacent to the polydiacetylene film 12. In this way, conformational changes in the side chains of the polydiacetylene are sensitized, the planar-nonplanar transition of the main chain is rendered more facile, and changes in optical properties of the recording layer can be made to occur more rapidly. These light absorbing compounds absorb irradiated light (recording beam and erasure beam) from lasers and especially semiconductor lasers, and the hat produced is transferred to the polydiacetylene so as to promote transitions of the main chain. Such compounds must not, however, give any steric hindrance to the conformational changes of the polydiacetylene side chains.

Examples of such light absorbing compounds are aniline dyes disclosed in PUJPA Nos. 58-112790 and 58-125246; melocyanine dyes disclosed in PUJPA Nos. 58-212634 and 58-11790; naphthalocyanine dyes disclosed in PUJPA Nos. 61-291187, 61-268487, 61-177281, 62-56191, 61-25886 and 61-197280; pyrylium dyes disclosed in PUJPA Nos. 58-181588 and 58-181689; naphthoquinone dyes disclosed in PUJPA No. 59-20124; and anthraquinone or azo dyes.

If the light absorbing compound is to be incorporated in the polydiacetylene layer, it may be contained in a solution of diacetylene monomer, applied to the substrate, and the diacetylene monomer then polymerized as described above. On the other hand, if the light absorbing compound is to form another layer adjacent to the polydiacetylene film it may be dissolved in a suitable organic solvent, and the resulting solution is coated. Alternatively, the light absorbing compound may be formed as the layer by vacuum deposition.

As a matter of fact, a polymethyne (cyanine) dye represented by the formula:

chains, and thereby render the planar-nonplanar transition of the main chain more facile.

Such photoelectron carrier may be the same as the light absorbing compound cited above. Cyanine dyes, naphthalocyanine dyes (especially metal naphthalocyanines), polymethyne dyes, naphthoquinone dyes and azo dyes are effective as carriers, with cyanine dyes and naphthalocyanine dyes being particularly effective. These photoelectron carriers may also be used in conjunction with the above-noted light absorbing compounds.

If the photoelectron carrier is incorporated in the polydiacetylene layer, or if it is made to form another layer adjacent to the polydiacetylene film, the same techniques as are applied to light absorbing compounds may be used. In particular, naphthalocyanine dyes may be conveniently formed as another layer by vacuum deposition.

Figure 10:
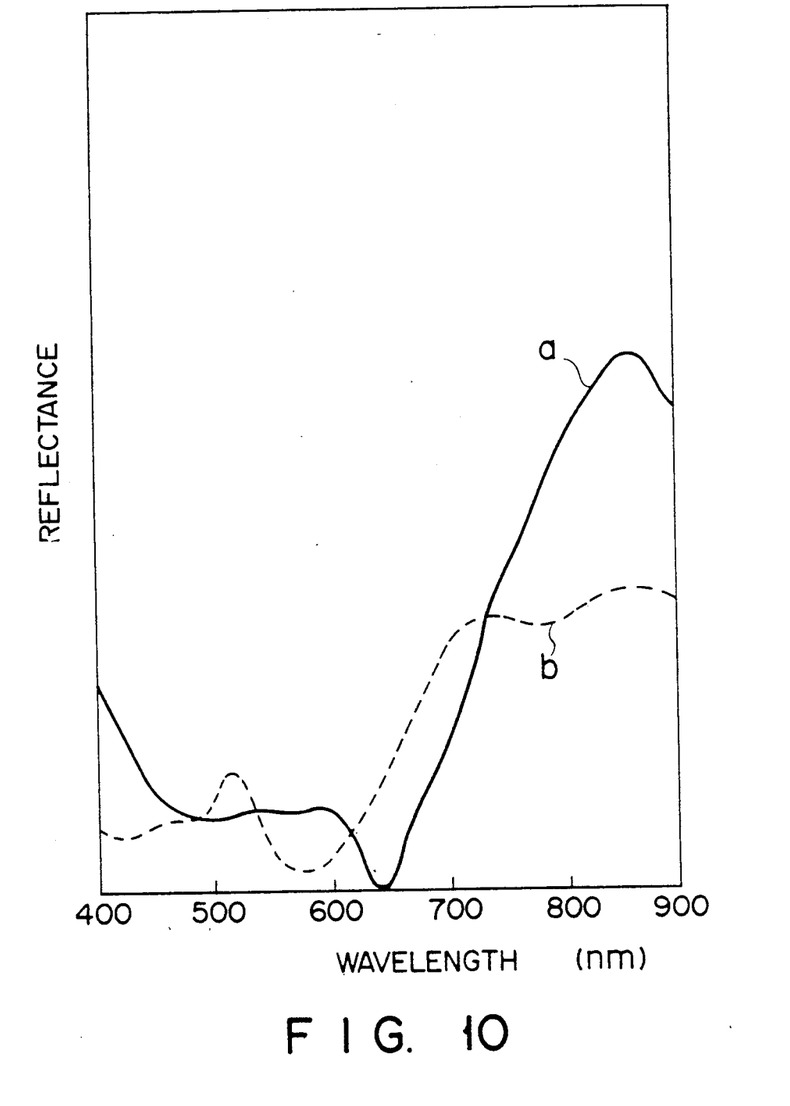

As a matter of fact, the recording layer was formed by vapor deposition of a film of chlorinated aluminum naphthalocyanine of thickness approx. 20 nm on a transparent substrate, vapor deposition of monomer A to a thickness of approx. 100 nm on the dye film, and polymerization of the monomer by irradiating it with ultraviolet light. When the recording medium thus obtained was irradiated from the substrate side with a semiconductor laser beam of wavelength 830 nm, the recording layer exhibited the wavelength - reflectance characteristics shown in FIG. 10. In the figure, curve a is the characteristic before laser irradiation, and curve b the characteristic after laser irradiation.

Figure 9:
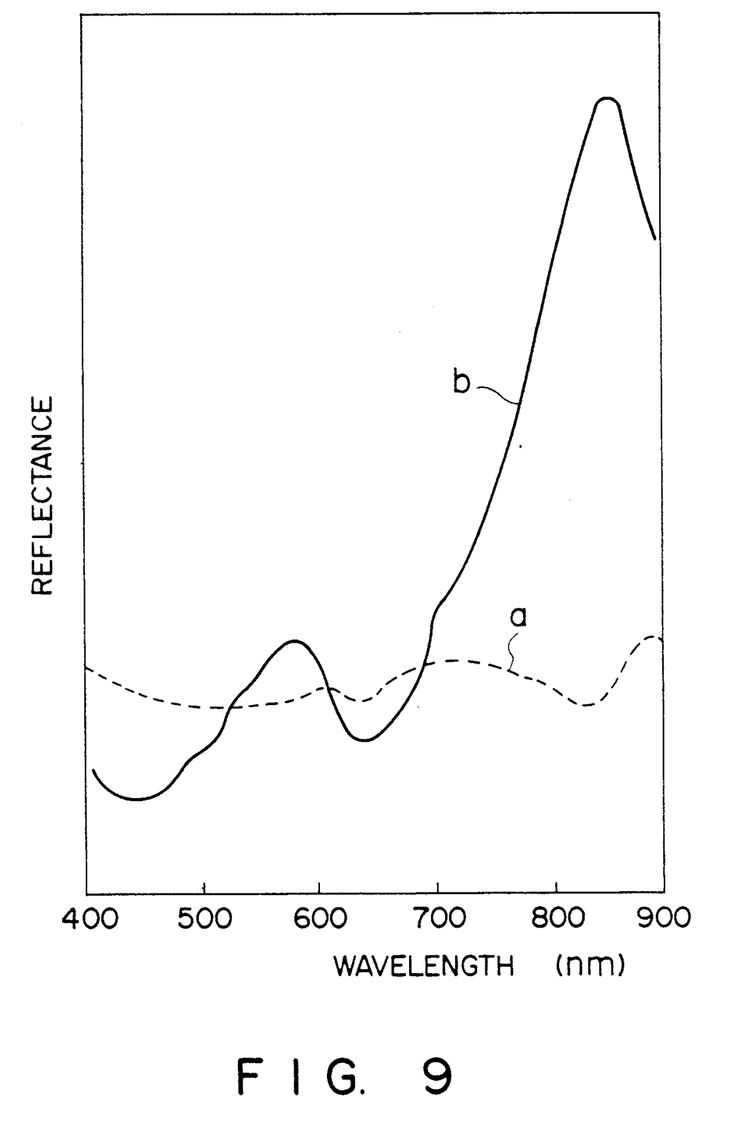
FIGS. 9 and 10 are graphs showing wavelength-reflectance characteristics of the recording medium according to different embodiments of this invention, respectively.

By using a light absorbing compound and/or a photoelectron carrier, sensitivity to laser and especially semiwas dissolved in a diacetylene monomer where Ra and Rb were $(CH_2)_4OCONHC_4H_9$ (referred to hereafter as monomer A), applied to a transparent substrate, and a recording layer then formed by polymerizing the diacetylene monomer with ultraviolet light irradiation. When this recording medium was irradiated from the substrate side by a semiconductor laser of wavelength 830 nm, the recording layer exhibited the wavelength - reflectance characteristics shown in FIG. 9. In the figure, curve a is the characteristic before laser irradiation, and curve b the characteristic after laser irradiation.

The present inventors also found that by incorporating at least one photoelectron carrier in the recording layer 12 (concentration approx. 0.1 to 10% by weight), or forming another layer of such a photoelectron carrier adjacent to the polydiacetylene film (preferably thinner than the polydiacetylene film), the write and erase speed of the recording layer can be increased. This photoelectron carrier generates excited electrons (photoelectrons) and positive holes hen irradiated by a laser beam, and in particular by a semiconductor laser beam. Either the photoelectrons or the holes move into the molecular structure of the polydiacetylene, sensitize conformational changes in the polydiacetylene side conductor laser beams is increased, recording and erasure can be performed at a very high speed of several tens of nanoseconds or less, contrast variations are emphasized, and a high S/N ratio is obtained.

Figure 11:
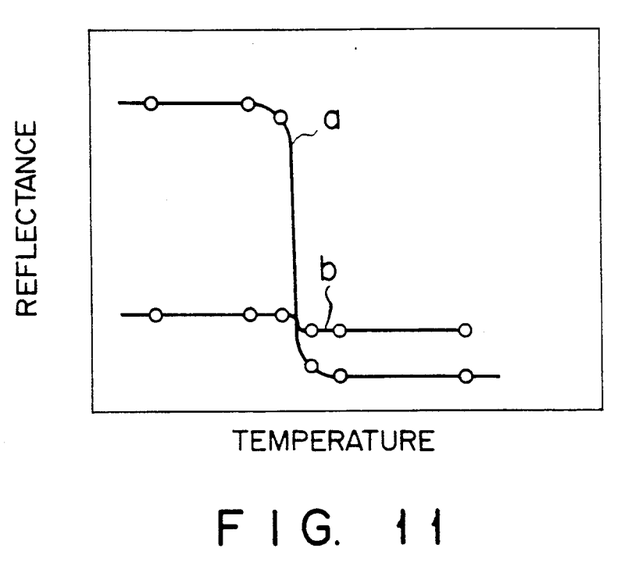
FIG. 11 is a graph showing reflectance-temperature characteristics of recording media which contain or do not contain a pigment.

FIG. 11 shows the relation between reflectance and temperature for light of 830 nm wavelength in the case of a polydiacetylene film containing a light absorbing compound (curve a), and a polydiacetylene film not containing such a compound (curve b). It is seen from this figure that the change of reflectance increases when the film contains a light absorbing compound.

Figure 2:
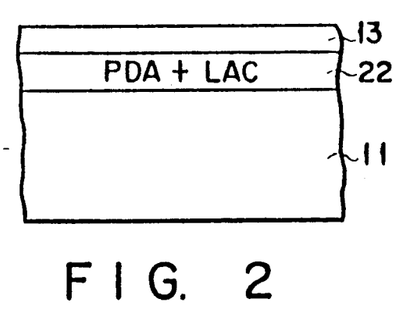

FIG. 2 shows a recording medium of this invention with a recording layer 22 wherein a light absorbing compound (LAC) has been incorporated in a polydiacetylene (PDA) film.

Figure 3:
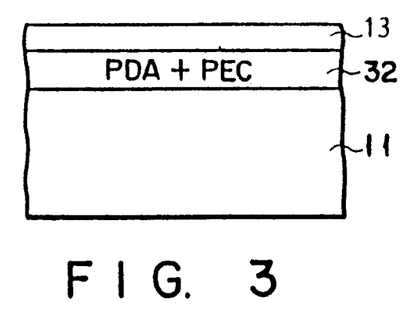

FIG. 3 shows a recording medium of this invention with a recording layer 32 wherein a photoelectron carrier (PEC) has been incorporated in a polydiacetylene film.

Figure 4:
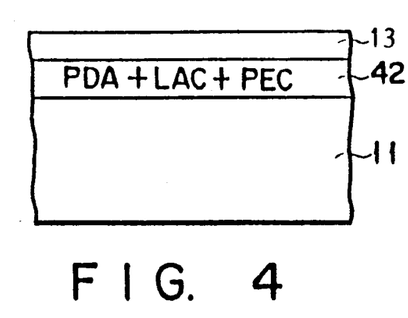

FIG. 4 shows a recording medium of this invention with a recording layer 42 wherein a light absorbing carrier and a photoelectron carrier have both been incorporated in a polydiacetylene film.

Figure 5:
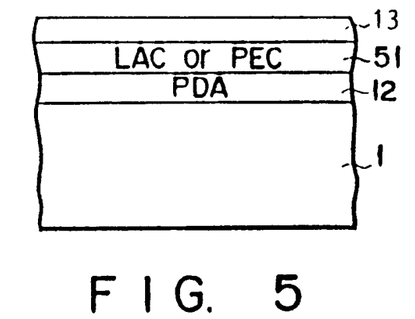

FIG. 5 shows a recording medium of this invention wherein a film 51 light absorbing compound or a photoelectron carrier has been built up or formed on a polydiacetylene film 12 which may or may not contain a photoelectron carrier and/or light absorbing compound.

Figure 6:
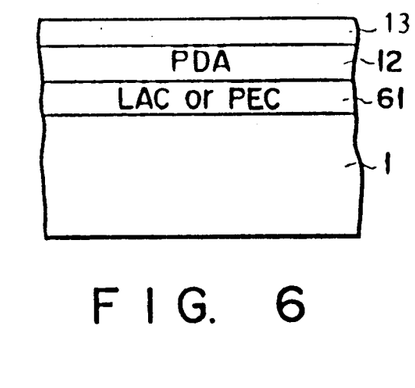

FIG. 6 shows a recording medium of this invention wherein a film 61 of a light absorbing compound or a photoelectron carrier has been interposed between substrate 11 and a polydiacetylene film 12 which may or may not contain a photoelectron carrier and/or light absorbing compound.

Figure 7:
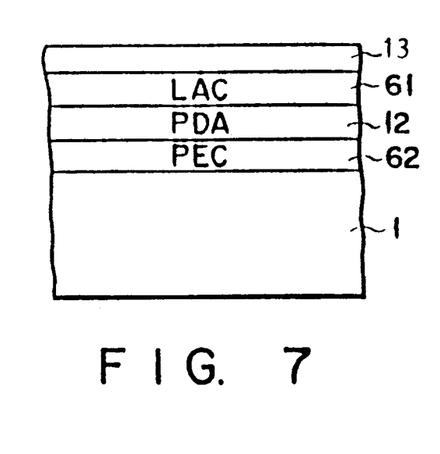

FIG. 7 shows a recording medium of this invention wherein a polydiacetylene film 12 has been sandwiched between a film of a light absorbing compound 61 and a film of a photoelectron carrier 62. In this case, the positions of films 61 and 62 may be reversed.

The principle of recording or writing, reproduction or reading and erasure of information has been described above with the recording medium. This is again summarized below.

Recording

A recording beam carrying information signals is allowed to irradiate the recording layer. The heat produced causes a planar-nonplanar transition to occur in the polydiacetylene which changes the optical properties (normally the reflectance) of the recording layer, and thereby effects the recording Reproduction A laser beam of lower power than the recording beam, or of different wavelength to the latter, is used to detect the difference of optical properties (normally the reflectance) between recorded sites and unrecorded sites, and thereby effects reproduction of the recorded information.

Erasure

A laser beam of different power or wavelength to the recording beam is allowed to irradiate the recorded sites causing a planar-nonplanar transition opposite to that which occurs during recording and a return to the initial state. This effects erasure of the recorded information.

Figure 12:
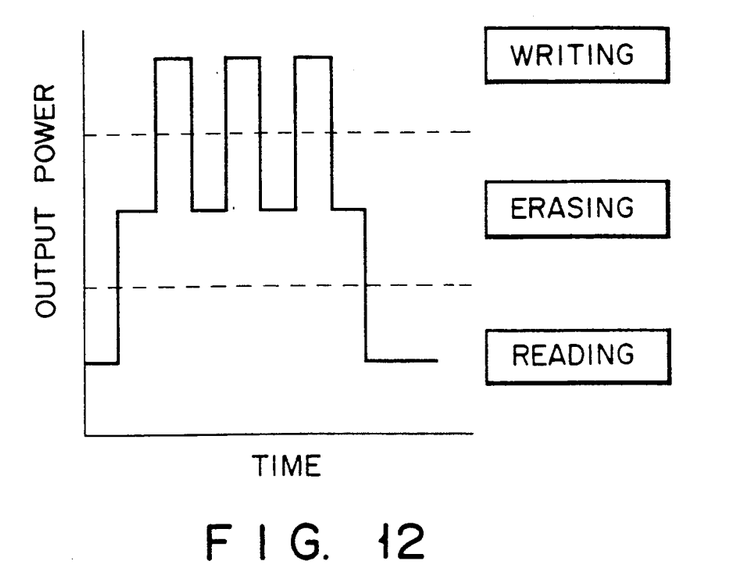
FIGS. 12 and 13 respectively show waveforms of light pulses used for recording, reproduction and erasure in the recording medium of this invention.
Figure 13:
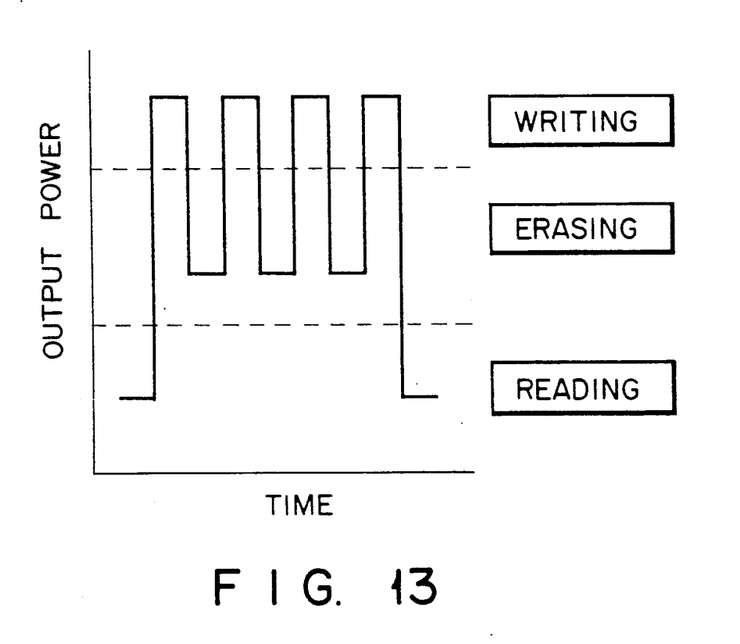

As shown in FIGS. 12 and 13, recording, reproduction and erasure can thus be performed by irradiating the recording layer with light pulses of different power levels. This arrangement also permits overwriting, and it was confirmed that the recording operation could be repeated more than several hundred thousands of times.

Figure 14:
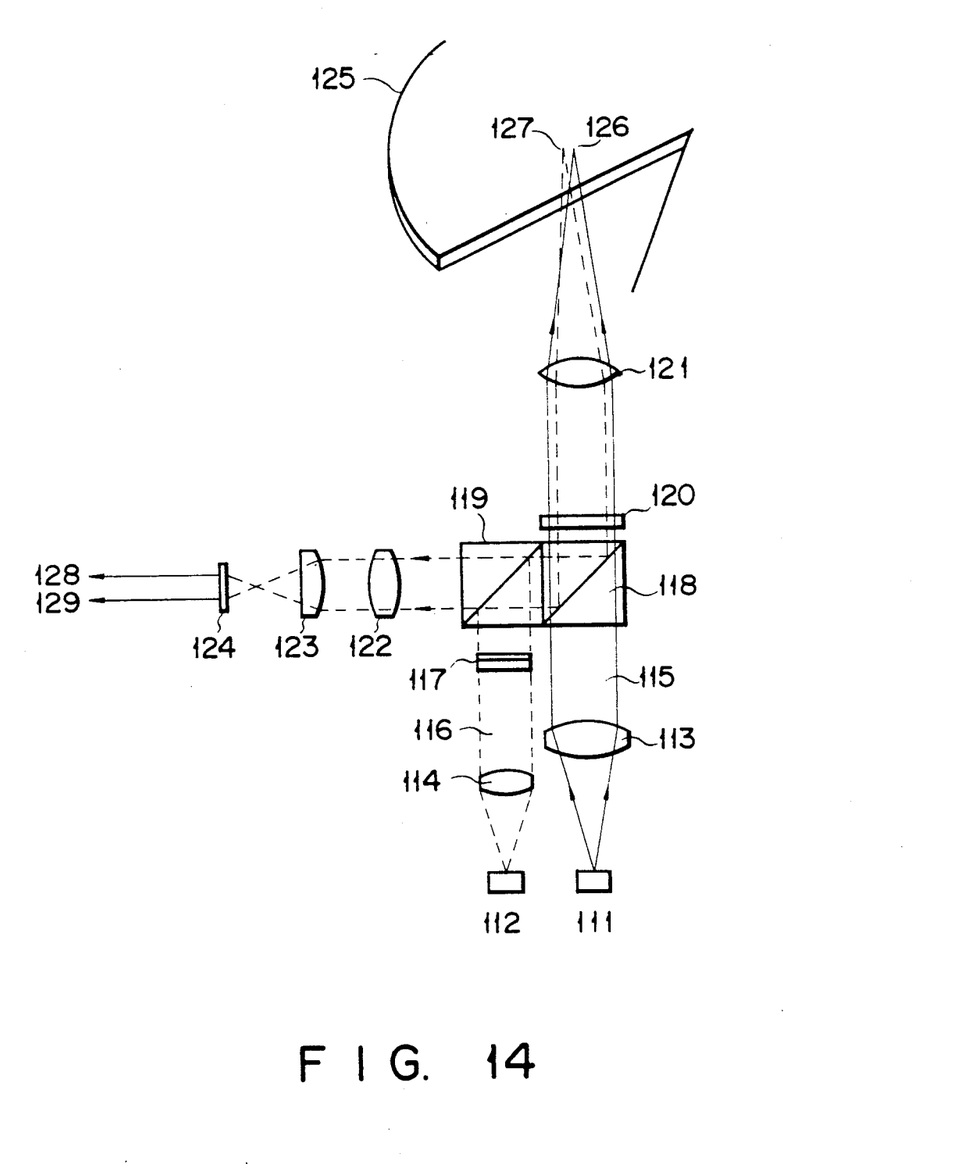
FIGS. 14 and 15 schematically show the optical recording equipment which can be suitably used in conjunction with the recording medium of this invention.
Figure 15:
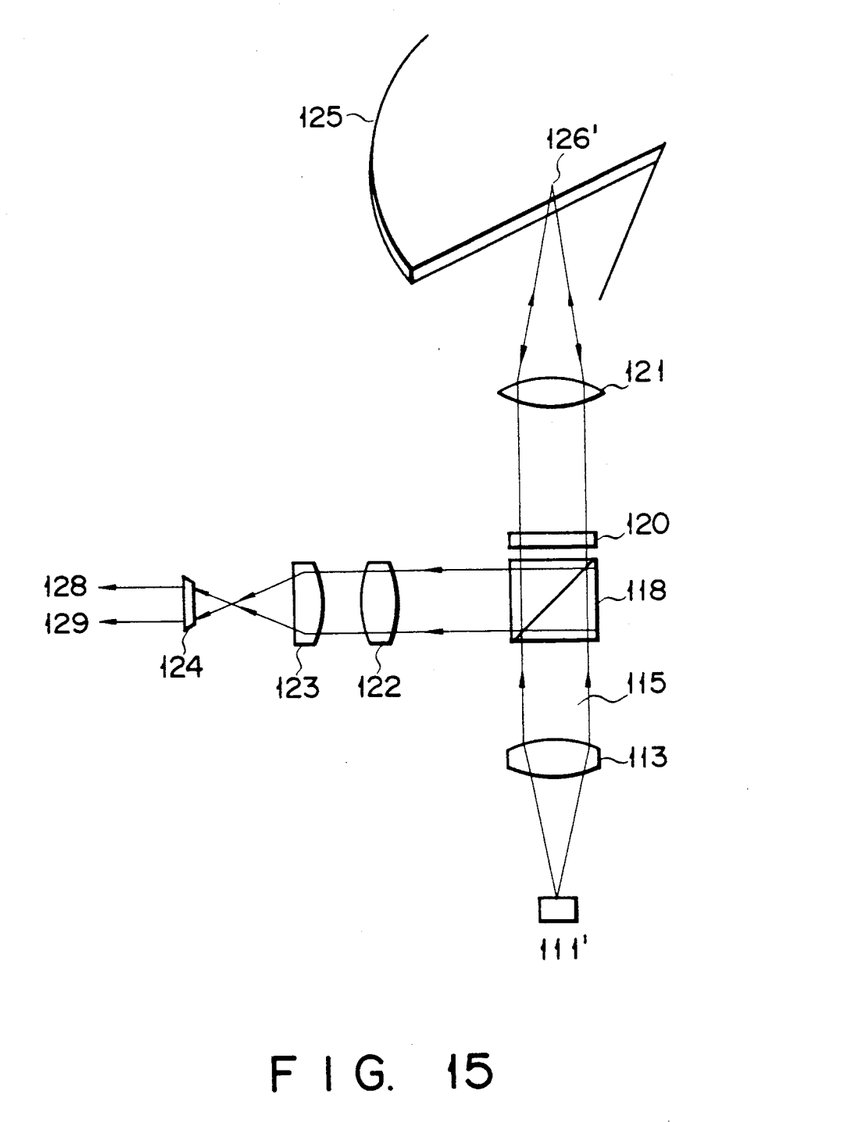

FIGS. 14 and 15 respectively show different types of equipment for recording, reproduction and erasure using the recording medium of this invention. This equipment moreover is not specialized, and has been conventionally used in the prior art. The equipment shown in FIG. 14 uses light from different sources to perform recording and erasure, and reproduction. Laser light from a recording or erasing semiconductor laser 111 is collimated by collimating lens 113 to form a beam 115, passes via a polarizing beam splitter 118 through a ¼ wave plate 120, and leaves condensing lens 121 to cast a spot 126 on the recording layer of the optical disk (recording medium) 125.

Light from the reproduction light source (light emitting diode or semiconductor laser) 112 is collimated by collimating lens 114 to form a beam 116, passes via the cylindrical lens 117 through polarizing beam splitter 119, passes via polarizing beam splitter 118 through a ¼ wave plate 120, and leaves condensing lens 121 to cast a spot 127 on the recording layer of optical disk 125. Light reflected from the recording layer then follows the reverse path to that used to irradiate the medium 125, reaching polarizing beam splitter 122, and passing via condensing lens 122 and cylindrical lens 123. It may then be extracted from a signal detector, for example a PIN diode 124 having four sensitive regions, as a servo signal 128 and an information signal 129.

FIG. 15 on the other hand shows a type of equipment where recording, reproduction and erasure are performed by varying the output of one semiconductor laser 111, and there is therefore no optical system for reproduction light as in FIG. 14.

In this invention, various light sources capable of emitting laser light pulses can be used for recording and erasing information depending on the absorption wavelength of the light absorbing compound, for example an argon laser, helium-neon laser, helium-cadmium laser, dye laser or semiconductor laser. It is however preferable to use a semiconductor laser as it is highly practical, and permits the design of a low-cost and small weight. For reproduction, the low output, continuous oscillation of a light emitting diode or other similar device, or the same laser beam as for recording and erasure, may be used.

This invention will now be described with reference to Examples but it should however be understood that it is in no way limited to them. Further, in the Examples that follow, changes in reflectance of the recording layer are given for the case where continuous oscillation laser light (wavelength 830 nm, output 0.5 mW) from a light emitting diode (LED) is used as the reproduction light, unless otherwise specified.

EXAMPLE 1

A homogeneous solution was prepared by thoroughly mixing together 1 part by weight of cyanine dye (NK-3153 available from Japanese Research Institute For Photosensitizing Dyes Co., Ltd), 100 parts by weight of 3,5-octadiyne-1,8-diol-bis (N-ethyl carbamate), and 1000 parts by weight of methyl ethyl ketone. This solution was applied by spin coating (1600 rpm, 10 sec) to a transparent substrate of epoxy resin, and thoroughly dried. The whole surface of the dried film was irradiated with ultraviolet light (365 nm) for 30 seconds to polymerize the diacetylene monomer, and form a polydiacetylene film of thickness 400 nm containing pigment. Cobalt naphthalocyanine was then vacuum deposited on the polydiacetylene film to a thickness of 50 nm. In addition, silver was vacuum deposited on the naphthalocyanine film to a thickness of 200 nm to form a reflecting layer. A recording medium according to this invention was thereby obtained. The polydiacetylene exhibited a transition point I of about 150° C., and a transition point II of about 130° C.

When the naphthalocyanine layer of this recording medium was irradiated by a semiconductor laser beam (wavelength 830 nm, output 3.8 mW) for 20 nanoseconds (ns), the reflectance of the recording layer with respect to the LED light increased by 16% compared to its value before the laser irradiation. When the polydiacetylene film was irradiated by a semiconductor laser beam of the same wavelength at an output of 3.1 mW for 500 ns, the reflectance with respect to LED light decreased by 14%. This confirmed that the recording support could be used for recording and erasure with laser light.

EXAMPLE 2

Aluminum naphthalocyanine was first deposited by means of vacuum deposition to a thickness of 200 nm on a transparent acrylic substrate. 5,7-dodecadiyne-1,12-diol-bis (N-ethyl carbamate), a diacetylene monomer, was vapor deposited on this first layer, and irradiated by ultraviolet light (wavelength 365 nm) for 30 seconds to form a polydiacetylene film of thickness 100 nm. Aluminum was then vacuum deposited on the polydiacetylene film to a thickness of 200 nm to form a reflecting layer. In this way, a recording medium according to this invention was obtained. The polydiacetylene exhibited a transition point I of about 125° C., and a transition point II of about 90° C.

When this recording medium was irradiated by a semiconductor laser beam wavelength 830 nm, output 3.8 mW) for 20 nanoseconds (ns) (recording), the reflectance of the recording layer with respect to the LED light decreased by 15% compared to its value before recording. When the polydiacetylene film was irradiated by a semiconductor laser beam of the same wavelength at an output of 2.5 mW for 500 ns (erasure), the reflectance with respect to the LED light increased by 15%, and it was confirmed that the recording had been completely erased. Further, there was found to be no problem in repeating recording and erasure 100 times.

EXAMPLE 3

A homogeneous solution was prepared by thoroughly mixing together 100 parts by weight of 5,7-dodecadiyne-1,12-diol-bis (N-ethyl carbamate), 2 parts by weight of cyanine dye (NK-3106 available from Japanese Research Institute For Photosensitizing Dyes Co., Ltd.), and 1000 parts by weight of dichloroethane. This solution was applied by spin coating (1600 rpm, 10 sec) to a transparent substrate of polycarbonate, and thoroughly dried. The dried film was irradiated with ultraviolet light (wavelength 365 nm) for 30 seconds so as to form a polydiacetylene film of thickness 450 nm containing pigment. Aluminum was then vacuum deposited on this film to a thickness of 200 nm to form a reflecting film. The polydiacetylene exhibited a transition point I of about 125° C., and a transition point II of about 90° C.

In the following procedures, a semiconductor laser (wavelength 830 nm, output power 0.4 mW) was used as a reproducing or reading light, instead of the LED light.

When the recording medium obtained above was irradiated by a semiconductor laser beam (wavelength 830 nm, output 3.8 mW) for 20 ns (recording), the reflectance of the recording layer with respect to the reading light increased by 23% compared to its value before recording. When the polydiacetylene film was irradiated by a semiconductor laser beam of the same wavelength at an output of 2.7 mW for 500 ns (erasure), the reflectance with respect to the reading laser light decreased by 23%. This confirmed that recording, reproduction and erasure could be performed merely by varying the output of a 830 nm semiconductor laser beam. Further, there was found to be no problem in repeating recording and erasure 100 times.

EXAMPLE 4

Cobalt naphthalocyanine was first vacuum deposited to a thickness of 20 nm on a transparent substrate of polycarbonate. A homogeneous solution was then prepared by mixing together 1 part by weight of cyanine dye (NK-2014 available from Japanese Research Institute For Photosensitizing Dyes Co., Ltd.), 100 parts by weight of 3,5-dodecadiyne-1,12-diol-bis (butoxycarbonylmethylurethane), and 1000 parts by weight of dichloroethane. This solution was applied by spin coating (1600 rpm, 10 sec) to the naphthalocyanine deposit, and thoroughly dried. The whole surface of the dried film was irradiated with ultraviolet light (365 nm) for 30 seconds to polymerize the diacetylene monomer, and form a polydiacetylene film of thickness 400 n containing pigment. Aluminum was then vacuum deposited on the polydiacetylene film to a thickness of 200 nm to form a reflecting film. A recording medium according to this invention was thereby obtained. The polydiacetylene exhibited a transition point I of about 125° C., and a transition point II of about 90° C.

In the following procedures, continuous oscillation laser light (wavelength 780 nm, output 0.5 mW) from an LED is used a the reproduction light.

When the naphthalocyanine layer of the recording medium obtained above was irradiated from the substrate side by a semiconductor laser beam (wavelength 780 nm, output power 3.3 mW) for 20 ns (recording), the reflectance of the recording layer with respect to LED light increased by 17% compared to its value before recording. When the polydiacetylene film was irradiated by a semiconductor laser beam of the same wavelength at an output of 2.7 mW for 500 ns, the reflectance with respect to LED light decreased by 17% to its value before recording. Further, there was found to be no problem in repeating recording and erasure 100 times.

EXAMPLE 5

Cyanine dye (NK-3106) was first dissolved in chloroform to give a solution of concentration 5% by weight. This solution was spin coated (1600 rpm, 20 seconds) onto a transparent substrate of epoxy resin, and thoroughly dried. 4,6-decadiyne-1,10-diol-bis (butoxycarbonylmethylurethane) was vapor deposited on this pigment layer, and irradiated with ultraviolet light (365 nm) for 30 seconds to form a polydiacetylene film of thickness 100 nm. Nickel naphthalocyanine was then vapor deposited on the polydiacetylene film to a thickness of 20 nm. A recording medium according to this invention was thereby obtained. The polydiacetylene exhibited a transition point I of about 135° C., and a transition point II of about 105° C.

When the naphthalocyanine layer of this recording medium was irradiated from the substrate side by a semiconductor laser beam (wavelength 830 nm, output 3.5 mW) for 20 ns (recording), the reflectance of the recording layer with respect to LED light decreased by 15% compared to its value before recording. When the cyanine pigment layer was irradiated by a semiconductor laser beam of the same wavelength at an output of 2.7 mW for 500 ns (erasure), the reflectance with respect to LED light increased by 17% to its value before recording.

COMPARATIVE EXAMPLE 1

A copper naphthalocyanine film of thickness 20 nm was vapor deposited onto a transparent substrate, and a film of nonacosa-10,12-diynoic acid was vapor deposited on the first film to a thickness of 100 nm. This diacetylene monomer film was then polymerized by irradiating it with ultraviolet light (365 nm) for 30 seconds, and gold was vapor deposited on the polydiacetylene film to a thickness of 200 nm (reflecting layer).

When the recording medium thus obtained was irradiated by a semiconductor laser beam (wavelength 830 nm, output 3.5 mW) for 20 ns, the reflectance with respect to LED light changed from 5% to 22%. However, when this recording medium was irradiated by a semiconductor laser beam of the same wavelength at an output of 8.7 mW for 500 ns, the reflectance increased further to 30% and did not return to its original value of 5%.

As described above, the present invention provides a recording medium which permits high speed recording and erasure, and also provides better contrast, sensitivity, repeatability and recording retention.

What is claimed is:

1. An erasable optical information recording medium comprising:
   a transparent substrate; and
   a recording layer supported by said substrate and comprising a thin film comprising at least one polydiacetylene with side chains, said polydiacetylene being capable of undergoing a reversible planar-nonplanar transition of the main chain structure of said polydiacetylene due to a conformational change of said side chains produced by irradiation of light, and having a repeating unit derived from a diacetylene monomer of the formula:

$$Ra-C\equiv C-C\equiv C-Rb$$

where Ra and Rb are respectively -X-Y-Z, wherein X is a spacer group $-(CH_2)_n-$, $-(C_mH_{2m-2})-$, $-(C_mH_{2m-4})-$, $-(C_pH_{2p}O)-$, or $-(C_pH_{2p-2}O)-$, n is an integer equal to 1 or more, m is an integer from 2 to 12, and p is an integer from 1 to 12;
   Y is a bivalent functional group capable of forming hydrogen bonds, and comprising a urethane bond, an amide bond, and imide bond or an amidoimide bond; and
   Z is a terminal group selected from the group consisting of a straight chain alkyl group, a straight chain unsaturated hydrocarbon group comprising a double bond, a straight chain unsaturated hydrocarbon group comprising a triple bond, an aromatic hydrocarbon group comprising a benzene ring and an aromatic hydrocarbon group comprising a naphthalene ring, said terminal group being unsubstituted or substituted by a substitutent selected from the group consisting of a cyano, hydroxyl, halogen and nitro group,
   whereby said recording layer undergoes said reversible planar-nonplanar transition at portions thereof which are irradiated with light to cause a corresponding change of optical properties thereof, thereby recording information thereinto and erasing information therefrom, and,
   whereby reading the recorded information is effected by detecting the change of reflectance, refractive index or transmittance of the recording layer.

2. The recording medium according to claim 1, wherein the polydiacetylene main chain has a conjugated $\pi$ electron system.

3. The recording medium according to claim 1, wherein Y is $-CONH-$, $-CONHCO-$, $-NHCONH-$, $-CONHCH_2OCO-$, $-CONHCH_2COO-$, $-NHCOO-$, $-OOCCH_3NHCOO-$, N2n or $-CON(CH_3)-$.

4. The recording medium according to claim 1, wherein Z is a straight chain alkyl group containing from 2 to 10 carbon atoms, a phenyl group, or a phenylalkyl group having 1 to 6 carbon atoms in the alkyl moiety.

5. The recording medium according to claim 1, wherein said polydiacetylene film comprises a light absorbing compound and/or a photoelectron carrier.

6. The recording medium according to claim 1, wherein said recording layer further comprises a film of a light absorbing compound adjacent to said polydiacetylene film.

7. The recording medium according to claim 6, wherein said light absorbing compound absorbs light from a semiconductor laser.

8. The recording medium according to claim 7, wherein said light absorbing compound is a polymethyne dye.

9. The recording medium according to claim 1, wherein said recording layer further comprises a film of a photoelectron carrier adjacent to said polydiacetylene film.

10. The recording medium according to claim 9, wherein said photoelectron carrier is a metal naphthalocyanine.

11. The recording medium according to claim 1, wherein each of n, m and p is 2 to 7.

12. An erasable optical information recording medium comprising:
   a transparent substrate; and
   a recording layer supported by said substrate and comprising a thin film comprising at least one polydiacetylene with side chains comprising therein an intervening bivalent functional group capable of forming hydrogen bonds therebetween, said polydiacetylene being capable of undergoing a reversible planar-nonplanar transition of the main chain structure of said polydiacetylene due to a conformational change of said side chains produced by irradiation of light,
   whereby said recording layer undergoes said reversible planar-nonplanar transition at portions thereof which are irradiated with light to cause a corresponding change of optical properties thereof, thereby recording information thereinto and erasing information therefrom, and
   whereby reading the recorded information is effected by detecting the change of reflectance, refractive index or transmittance of the recording layer.

13. The recording medium according to claim 12, wherein said functional group contains a urethane bond, an amide bond, an imide bond or an amidoimide bond.

14. The recording medium according to claim 1, wherein said substrate comprises glass, polyester, polycarbonate, polyvinyl chloride, polyamide, polyacrylate, polymethacrylate, epoxy resin, or olefinic plastic material.

15. The recording medium according to claim 12, wherein said substrate comprises glass, polyester, polycarbonate, polyvinyl chloride, polyamide, polyacrylate, polymethacrylate, epoxy resin, or olefinic plastic material.

16. The recording medium according to claim 1, wherein the film has a thickness of 100 nm to 10 μm.

17. The recording medium according to claim 12, wherein the film has a thickness of 100 nm to 10 μm.

18. The recording medium according to claim 4, wherein Y is $-CONH-$, $-NHCONH-$, $-CONHC-$ H₂OCO—, —CONHCH₂COO—, —NHCOO—, —OOCH₃NHCOO—, —CON(CH₃)— or —N≡N—.

19. The recording medium according to claim 1, wherein said recording layer further comprises a film of a light absorbing compound and a film of a photoelectron carrier and said polydiacetylene film is disposed between said film of a light absorbing compound and said film of a photoelectron carrier.

* * * * *